United States Patent [19]

Saitoh

[11] Patent Number: 4,957,989
[45] Date of Patent: Sep. 18, 1990

[54] VEHICLE FOR SLOW DISSOLVING COATING MATERIAL

[75] Inventor: Nobuhiro Saitoh, Gunma, Japan

[73] Assignee: Toshiba Silicone Co., Ltd., Tokyo, Japan

[21] Appl. No.: 470,669

[22] Filed: Jan. 26, 1990

[30] Foreign Application Priority Data

Jan. 27, 1989 [JP] Japan .................................... 1-16266

[51] Int. Cl.$^5$ ........................................... C08F 230/08
[52] U.S. Cl. ................................... 526/279; 526/214; 526/222
[58] Field of Search .................... 526/279, 214, 222

[56] References Cited

U.S. PATENT DOCUMENTS 4,064,338 12/1977 Russel ................................. 526/230
4,593,055 6/1986 Gitlitz et al. ........................ 524/547

FOREIGN PATENT DOCUMENTS 59-232110 12/1984 Japan .................................. 526/279
61-53311 3/1986 Japan .................................. 526/279
1-101311 4/1989 Japan .................................. 526/279

OTHER PUBLICATIONS

"Synthesis of Ionic Block Polymers for Desalination Membranes", Jour. of Polymer Science, vol. 11, pp. 587–610 (1973).

Primary Examiner—Joseph L. Schofer
Assistant Examiner—N. Sarofim
Attorney, Agent, or Firm—Sughrue, Mion, Zinn, Macpeak & Seas

[57] ABSTRACT

A vehicle for slow dissolving a coating material, comprising a triorganosilyl (meth) acrylate copolymer consisting essentially of repeating units represented by the formula

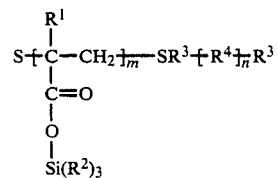

The vehicle contains no harmful substances and is non-toxic, and therefore can be advantageously used as a vehicle for safe and effective coatings or treating agents.

7 Claims, No Drawings

VEHICLE FOR SLOW DISSOLVING COATING MATERIAL

FIELD OF THE INVENTION

The present invention relates to a vehicle for a slow dissolving coating material. More particularly, this invention relates to a vehicle for a slow dissolving coating material, which can provide a coating material having a small change in hydrolysis rate with the lapse of time.

BACKGROUND OF THE INVENTION

A method for preventing the attachment and growth of marine organisms is known, comprising preparing a paint using a copolymer, as a vehicle, obtained by polymerizing a triorganotin (meth)acrylate with another (meth)acrylate to form hydrolyzable triorganotin groups in the side chains of the resulting polymer molecule, gradually dissolving the vehicle upon hydrolysis in the seawater to prevent the attachment of marine organisms to the paint surface, and suppressing the multiplication of marine organisms by the physiological activity of the triorganotin group-containing compound generated, as disclosed in, for example, No. JP-B-57-39250 (the term "JP-B" as used herein means an "examined Japanese patent publication"). Although this method is highly effective for ship bottom paints and antifouling agents for fishing nets, the growth of fishes and shellfishes is adversely affected by the contamination of the seawater by triorganotin compounds released from such paints, and this has become an environmental problem.

It has been proposed to prevent the attachment of marine organisms by the action of a hydrolyzable polymer obtained by using a triorganosilyl (meth)acrylate in place of the triorganotin compound, as disclosed in, for example, U.S. Pat. No. 4,593,055. Known triorganosilyl (meth)acrylate polymers which can be used for the above purpose include a homopolymer of trimethylsilyl (meth)acrylate, and copolymers of trimethylsilyl (meth)acrylate and various (meth)acrylic or vinyl compounds such as methyl methacrylate, butyl methacrylate, styrene, 9-vinylphenanthrene, vinylpyridine, and p-dimethylaminostyrene, as disclosed in, for example, D.N. Andreev et al., Izvestya Akademiya Nauk SSSR, Ser, Khim, 1972, Vol.6, pp. 1411–1413; M. Kurihara et at., Journal of Polymer Science, Polymer Chemistry, Vol.11, No.3, pp.587–610 (1973).

These copolymers, however, are disadvantageous in that the polymerization for obtaining the copolymers is difficult to control because of extreme rapidity of the polymerization of trimethylsilyl (meth)acrylate. Furthermore, they have problems that trimethylsilyl groups in the polymers are easily released from the main chains upon hydrolysis, and stability necessary for handling cannot be obtained due to their poor water resistance.

The present inventors previously found that for enhancing the steric hindrance of a silyl group to control hydrolysis, it is effective to use a monovalent hydrocarbon group having 4 or more carbon atoms as at least one of the organic groups linked to the silicon atom, and they proposed this polymer in No. JP-A-62-79514. (The term "JP-A" as used herein means an "unexamined published Japanese patent application".) However, such polymer is not satisfactory in that the rate of hydrolysis of the polymer in seawater changes considerably with the lapse of time. Illustratively stated, the polymer does not undergo sufficient hydrolysis in the initial stage of immersion to prevent attachment of marine organisms to the paint surface, and after that, the polymer begins to dissolve away quickly with the lapse of time, resulting in a tendency that the paint disappears in a relatively short period of time. Thus, a problem still remains to be further improved.

SUMMARY OF THE INVENTION

Accordingly, an object of the present invention is to provide a vehicle for slow dissolving coating material, which has substantially no change in hydrolysis rate with the lapse of time and has a constant hydrolysis property.

The vehicle for slow dissolving coating material according to the present invention comprises a triorganosilyl (meth)acrylate copolymer consisting essentially of repeating units represented by the formula

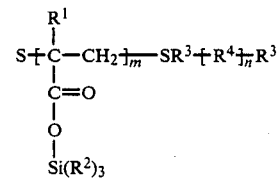

wherein $R^1$ represents hydrogen or methyl; $R^2$ represents a monovalent hydrocarbon group; $R^3$ is a group selected from the group consisting of

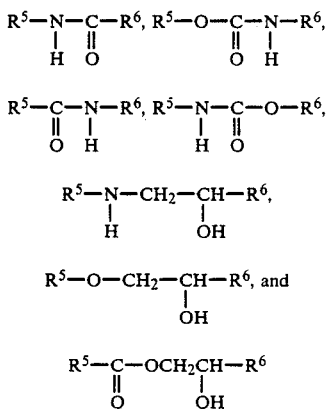

wherein $R^5$ represents a divalent hydrocarbon group containing an oxygen atom, an aromatic ring, or an alicyclic ring, and $R^6$ represents a divalent hydrocarbon group containing an oxygen atom, a sulfur atom, an aromatic ring, or an alicyclic ring; $R^4$ represents a divalent hydrocarbon group having 2 to 18 carbon atoms and containing an oxygen atom, an aromatic ring, or an alicyclic ring; and m and n each represents an integer of 1 or larger.

DETAILED DESCRIPTION OF THE INVENTION

The term "(meth)acrylate" as used herein means both acrylate and methacrylate.

The vehicle of this invention contains a triorganosilyl (meth)acrylate copolymer consisting essentially of repeating units represented by the above-described formula.

$R^1$ in the formula is hydrogen or methyl.

$R^2$ in the formula is a monovalent hydrocarbon group. Examples thereof include straight-chain or branched alkyl groups such as methyl, ethyl, propyl, butyl, hexyl, octyl, decyl, dodecyl, myristyl, and stearyl; cycloalkyl groups such as cyclopentyl and cyclohexyl; a phenyl group; and condensation ring type hydrocarbon groups such as norbornyl and ethylidenenorbornyl. In a preferred embodiment, at least one of the $R^2$ groups is a monovalent hydrocarbon group having 4 or more carbon atoms, so that appropriate hydrolysis properties can be imparted t the vehicle of this invention.

$R^3$ and $R^4$ in the formula each has the same meaning as defined hereinbefore. It is preferred that $R^4$ is a divalent hydrocarbon group derived from an ethylenically unsaturated compound.

In the formula, m and n each is an integer of 1 or larger. Preferably, m is 2 or larger and n is also 2 or larger.

The triorganosilyl (meth)acrylate copolymer contained in the vehicle of the invention and consisting essentially of the repeating units as described above is a copolymer of a both-end-functional triorganosilyl (meth)acrylate oligomer and a both-end-functional oligomer.

The both-end-functional triorganosilyl (meth)acrylate oligomer which constitutes the above copolymer can be obtained by polymerizing at least one triorganosilyl (meth)acrylate and, if needed, an unsaturated monomer copolymerizable therewith in a suitable organic solvent in the presence of a polymerization initiator and a chain transfer agent.

Examples of such triorganosilyl (meth)acrylate include dimethylbutylsilyl (meth)acrylate, dimethyl-t-butylsilyl (meth)acrylate, dimethylhexylsilyl (meth)acrylate, dimethyloctylsilyl (meth)acrylate, dimethyldecylsilyl (meth)acrylate, dimethyldodecylsilyl (meth)acrylate, dimethylcyclohexylsilyl (meth)acrylate, dimethylphenylsilyl (meth)acrylate, methyldibutylsilyl (meth)acrylate, ethyldibutylsilyl (meth)acrylate, dibutylhexylsilyl (meth)acrylate, dibutylphenylsilyl (meth)acrylate, tributylsilyl (meth)acrylate, triphenylsilyl (meth)acrylate, dimethylnorbornylsilyl (meth)acrylate, and dimethyl(ethylidenenorbornyl)silyl (meth)acrylate. These triorganosilyl (meth)acrylates may be used alone or in combination of two or more thereof. A triorganosilyl (meth)acrylate having a proper hydrolysis rate can suitably be selected according to the purpose of use of the slow dissolving coating material and the conditions under which the coating material is used. Preferred of the above-described triorganosilyl (meth)acrylates are methyldibutylsilyl (meth)acrylate, tributylsilyl (meth)acrylate, dimethylnorbornylsilyl (meth)acrylate, and dimethyl(ethylidenenorbornyl)silyl (meth)acrylate, from the standpoint that the rate of hydrolysis can be controlled easily.

Examples of the unsaturated monomer which is copolymerizable with the triorganosilyl (meth)acrylate and contains no triorganosilyl groups in its molecule are styrene, α-methylstyrene, (meth)acrylic acid, methyl (meth)acrylate, ethyl (meth)acrylate, propyl (meth)acrylate, butyl (meth)acrylate, hexyl (meth)acrylate, octyl (meth)acrylate, dimethylaminoethyl (meth)acrylate, 2-hydroxyethyl (meth)acrylate, and glycidyl (meth)acrylate. These may be used alone or in combination of two or more thereof. Such an unsaturated monomer copolymerizable with the triorganosilyl (meth)acrylate can suitably be selected and used according to the purpose of use of the slow dissolving coating material. However, methyl methacrylate or styrene is preferably used for improving the film-forming properties of the coating material and for increasing the mechanical strength of the coating films, while 2-hydroxyethyl (meth)acrylate is preferred in order to impart hydrophilicity to the vehicle.

The organic solvent used in the polymerization of the triorganosilyl (meth)acrylate serves to control the polymerization reaction and prevent gelation during the reaction. Examples of the organic solvent include hydrocarbon-type solvents such as benzene, toluene, and xylene; ester-type solvents such as ethyl acetate and butyl acetate; alcohol-type solvents such as isopropanol and butanol; and non-protonic polar solvents such as dimethylformamide and dimethyl sulfoxide.

The amount of the organic solvent used is 20 to 1,000 parts by weight, preferably 50 to 500 parts by weight, per 100 parts by weight of the monomer.

Examples of the polymerization initiator include organic peroxides such as benzoyl peroxide, p-chlorobenzoyl peroxide, 2,4-dichlorobenzoyl peroxide, t-butyl peroctoate, methyl ethyl ketone peroxide, and cumene hydroperoxide; and azobisisobutyronitrile.

The amount of the polymerization initiator used is 0.01 to 10 parts by weight per 100 parts by weight of the monomer.

Examples of the chain transfer agent are disulfides having at least two functional groups per molecular chain. Preferred examples of such compounds include bis(aminoethyl) disulfide, bis(aminopropyl) disulfide, bis(2-aminophenyl) disulfide, bis(3-aminophenyl) disulfide, bis(4-aminophenyl) disulfide, bis(2-aminoethylphenyl) disulfide, bis(3-aminoethylphenyl) disulfide, bis(4-aminoethylphenyl) disulfide, bis(2-isocyanatophenyl) disulfide, bis(3-isocyanatophenyl) disulfide, bis(4-isocyanatophenyl) disulfide, bis(3-propionic acid) disulfide, bis(2-salicylic acid) disulfide, bis(2-benzoic acid) disulfide, bis(2-hydroxyethyl) disulfide, and bis(6-hydroxy-2-naphthyl) disulfide.

The amount of the chain transfer agent used is 1 to 100 parts by weight, preferably 1.5 to 80 parts by weight, per 100 parts by weight of the monomer.

The chain transfer agent controls the molecular weight of the oligomer produced, and also acts to introduce a functional group such as an amino group, isocyanate group, carboxyl group, hydroxyl group, etc. into both ends of the molecular chain of oligomer.

Examples of the both-end-functional oligomer to be copolymerized with the both-end-functional triorganosilyl (meth)acrylate oligomer described above are α, ω-dicarboxy[(meth)acrylate oligomer], α, ω-diamino[(meth)acrylate oligomer], α, ω-diisocyanato[(meth)acrylate oligomer], hexamethylene diisocyanate oligomer, oligoether glycols, oligoester glycols, α, ω-diglycidyloligoethers, and ω-diglycidyloligobutadiene. From these, a suitable one or ones is/are selected for the copolymerization.

Preparation examples for triorganosilyl (meth)acrylate copolymers which can be contained in the vehicle of this invention are given below.

PREPARATION EXAMPLE 1

A triorganosilyl (meth)acrylate-(meth)acrylate block copolymer consisting essentially of repeating units represented by the formula

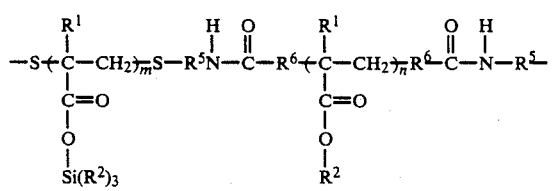

is prepared as follows.

A diamino[triorganosilyl (meth)acrylate oligomer] represented by the formula

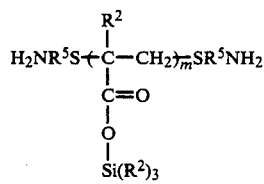

and having an amino group at both ends is reacted with dicarboxy[(meth)acrylate oligomer] having a carboxyl group at both ends at 150° C. for 40 hours in a N-methyl-2-pyrrolidone solvent in the presence of triphenyl phosphite. By this process, a copolymer consisting essentially of the above-described repeating units is obtained.

PREPARATION EXAMPLE 2

A triorganosilyl (meth)acrylate-poly(alkylene ether) block copolymer consisting essentially of repeating units represented by the formula

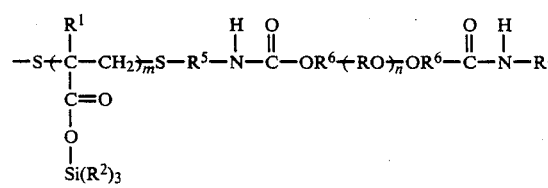

wherein R represents an alkylene group having 2 to 6 carbon atoms (hereinafter the same) is prepared as follows.

A diisocyanato[triorganosilyl (meth)acrylate oligomer] represented by the formula

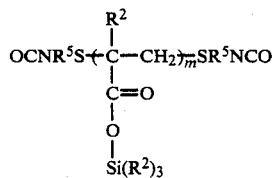

and having an isocyanate group at both ends is reacted with a dihydroxypoly(alkylene ether) having a hydroxyl group at both ends at room temperature. By this process, a copolymer consisting essentially of the above-described repeating units is obtained.

PREPARATION EXAMPLE 3

The same diisocyanato[triorganosilyl (meth)acrylate oligomer] as used in Preparation Example 2 is reacted with dicarboxy[(meth)acrylate oligomer] having a carboxyl group at both ends at room temperature.

By this process, a triorganosilyl (meth)acrylate(meth)acrylate block copolymer consisting essentially of repeating units of the formula in which $R^3$ is —$R^5NH(C=O)R^6$—is obtained.

PREPARATION EXAMPLE 4

A dicarboxy[triorganosilyl (meth)acrylate oligomer] having a carboxyl group at both ends is reacted with diamino[(meth)acrylate oligomer] having an amino group at both ends at 150° C. for 40 hours in a N-methyl-2-pyrrolidone solvent in the presence of triphenyl phosphite. According to this process, a triorganosilyl (meth)acrylate-(meth)acrylate block copolymer consisting essentially of repeating units of the formula in which $R^3$ is —$R^5CONHR^6$—is obtained.

PREPARATION EXAMPLE 5

A dicarboxy[triorganosilyl (meth)acrylate oligomer] having a carboxyl group at both ends is reacted with diisocyanato[(meth)acrylate oligomer] having an isocyanate group at both ends at room temperature. According to this process, a triorganosilyl (meth)acrylate-(meth)acrylate block copolymer consisting essentially of repeating units of the formula in which $R^3$ is —$R^5CONHR^6$—is obtained.

PREPARATION EXAMPLE 6

A triorganosilyl (meth)acrylate-polyether block copolymer consisting essentially of repeating units represented by the formula

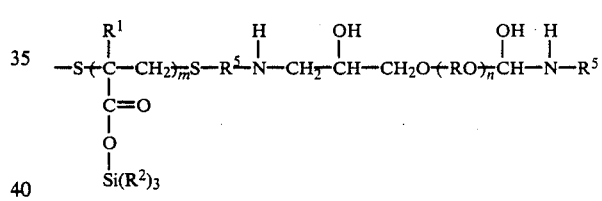

is prepared as follows.

The same diamino[triorganosilyl (meth)acrylate oligomer] as used in Preparation Example 1, which has an amino group at both ends, is reacted with a diglycidyloligoether having an epoxy group at both ends at room temperature for 8 hours. According to this process, a copolymer consisting essentially of the above-described repeating units is obtained.

PREPARATION EXAMPLE 7

A triorganosilyl (meth)acrylate block copolymer consisting essentially of repeating units represented by the formula

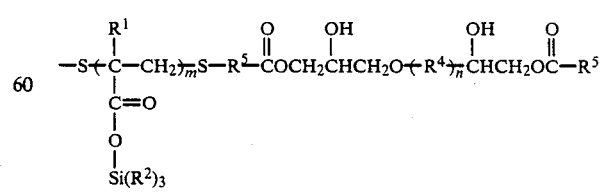

is prepared as follows.

A dicarboxy[triorganosilyl (meth)acrylate oligomer] represented by the formula

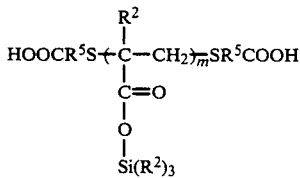

and having a carboxyl group at both ends is reacted with a diglycidyloligoester having an epoxy group at both ends at 100° C. for 4 hours. According to this process, a copolymer consisting essentially of the above-described repeating units is obtained.

PREPARATION EXAMPLE 8

A triorganosilyl (meth)acrylate block copolymer consisting essentially of repeating units represented by the formula

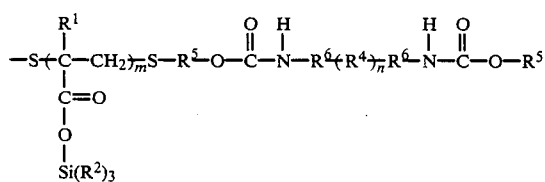

is prepared as follows.

A dihydroxy[triorganosilyl (meth)acrylate oligomer] represented by the formula

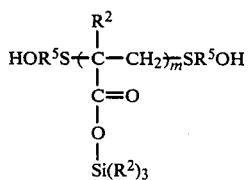

and having a hydroxyl group at both ends is reacted with hexamethylene diisocyanate oligomer having an isocyanate group at both ends at room temperature for 4 hours. According to this process, a copolymer consisting essentially of the above-described repeating units is obtained.

PREPARATION EXAMPLE 9

A triorganosilyl (meth)acrylate block copolymer consisting essentially of repeating units represented by the formula

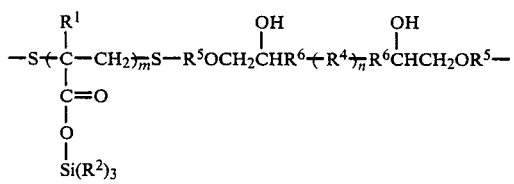

is prepared as follows.

The same dihydroxy[triorganosilyl (meth)acrylate oligomer] as used in Preparation Example 8, which has a hydroxyl group at both ends, is reacted with a diglycidyloligoester having an epoxy group at both ends at 70° C. for 8 hours. According to this process, a co-polymer consisting essentially of the above-described repeating units is obtained.

PREPARATION EXAMPLE 10

A triorganosilyl (meth)acrylate block copolymer consisting essentially of repeating units represented by the formula

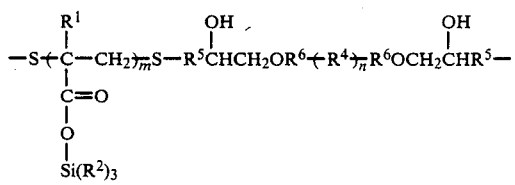

is prepared as follows.

A triorganosilyl (meth)acrylate oligomer represented by the formula

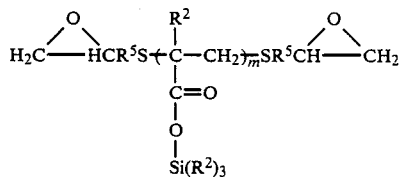

and having an epoxy group at both ends is reacted with a dihydroxy[triorganosilyl (meth)acrylate oligomer] having a hydroxyl group at both ends at room temperature for 4 hours. According to this process, a copolymer consisting essentially of the above-described repeating units is obtained.

PREPARATION EXAMPLE 11

A triorganosilyl (meth)acrylate block copolymer consisting essentially of repeating units represented by the formula

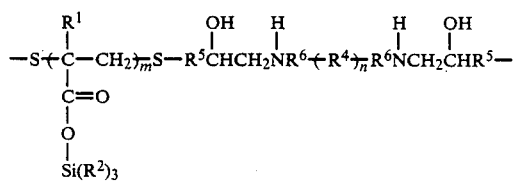

is prepared as follows.

The same triorganosilyl (meth)acrylate oligomer as used in Preparation Example 10, which has an epoxy group at both ends, is reacted with diamino[(meth)acrylate oligomer] having an amino group at both ends at room temperature for 4 hours. According to this process, a copolymer consisting essentially of the above-described repeating units is obtained.

PREPARATION EXAMPLE 12

A triorganosilyl (meth)acrylate block copolymer consisting essentially of repeating units represented by the formula

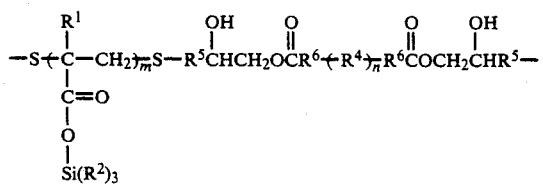

is prepared as follows.

The same triorganosilyl (meth)acrylate oligomer as used in Preparation Example 10, which has an epoxy group at both ends, is reacted with dicarboxy[(meth)-acrylate oligomer] having a carboxyl group at both ends at room temperature for 4 hours. According to this process, a copolymer consisting essentially of the above-described repeating units is obtained.

The copolymer prepared by the process described in each of the above Preparation Examples is obtained in the form of a reaction mixture. Therefore, the reaction mixture is concentrated to precipitate the copolymer, or the reaction mixture in the reactor is poured, as it is or after being diluted with an organic solvent, into a 10- to 50-fold quantity of a poor solvent to precipitate the copolymer, and the precipitated copolymer is filtered off and then dried or otherwise suitably treated. Thus, the copolymer is finally isolated.

According to need, other vehicle(s) and the like may be incorporated in the vehicle of this invention, which contains a triorganosilyl (meth)acrylate copolymer consisting essentially of the repeating units represented by the above-described general formula, so long as the object of the invention is not impaired.

The vehicle of the present invention has an appropriate hydrolysis rate, and the hydrolysis property does not substantially change with the lapse of time and is almost constant over a long period of time. Hence, the vehicle is useful as a vehicle for slow dissolving coating material.

Furthermore, since the vehicle of the invention contains no harmful substances such as organotins and is nontoxic, there is no fear of causing environmental pollution problems such as sea pollution. Therefore, the vehicle of the present invention can be advantageously used as a vehicle for safe and effective coatings or treating agents, such as ship bottom paints, antifouling agents for fishing nets, and surface-treating agents for water intake lines or underwater structures.

The present invention will now be explained by reference to the following Examples and Comparative Examples. In these examples, all parts are by weight.

The measurement of number-average molecular weight and the accelerated dissolution test were conducted according to the following methods.

Measurement of Number-Average Molecular Weight

A copolymer solution was as it was subjected to GPC (measuring machine HLC-802UR, calculating machine CP-8000, both manufactured by Tosoh Corporation, Japan), and from the chart obtained by refractive index values, the part derived from the solvent was subtracted, and the number-average molecular weight was determined in terms of that of polystyrene.

Accelerated Dissolution Test

2 To 3 grams of a copolymer solution was coated on the surface of a glass plate measuring 9x6 cm, and then heated at 60° C. for 12 hours to evaporation-remove the solvent, thereby forming a film of the copolymer. Subsequently, the resulting glass plate with the copolymer film was immersed in a 25° C. alkaline solution for accelerated hydrolysis which solution had been prepared by dissolving 480 g of common salt and 2.0 g of caustic soda in 18 liters of water, and a change in weight was measured at intervals of one day.

SYNTHESIS EXAMPLE 1

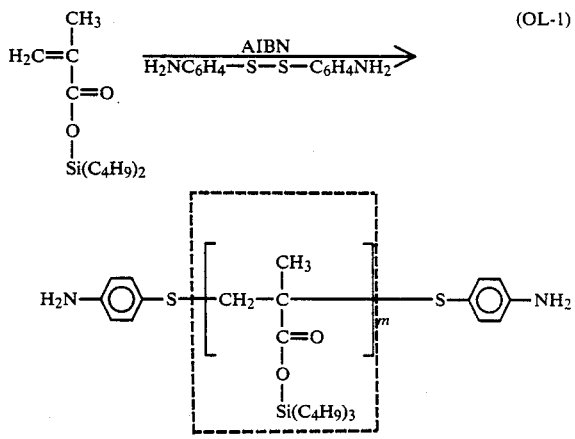

(Hereinafter, the unit enclosed with the broken line is abbreviated as "(I)".)

Into a reactor equipped with a stirrer, condenser, and thermometer were introduced 100 parts of xylene. Thereto were added the monomer as shown in Table 1 and bis(4-aminophenyl) disulfide as a chain transfer agent in respective amounts as shown in Table 1, and there was further added 0.6 part of azobisisobutyronitrile. The resulting mixture was heated, with uniform stirring, at 80° C. for 8 hours to conduct polymerization. Thus, diamino[tributylsilyl methacrylate oligomer] (OL-1) having an amino group at both ends was obtained. The number-average molecular weight of the thus-obtained oligomer was measured, and the value obtained is shown in Table 1.

SYNTHESIS EXAMPLE 2

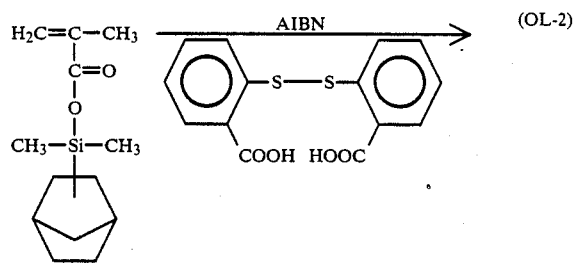

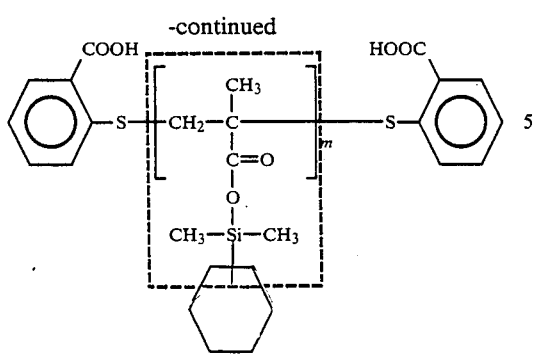

(Hereinafter, the unit enclosed with the broken line is abbreviated as "(II)".)

Using the monomer as shown in Table 1 and bis(2-salicylic acid) disulfide as a chain transfer agent, polymerization was conducted in the same manner as in Synthesis Example 1. Thus, dicarboxy(dimethylnorbornylsilyl acrylate oligomer) (OL-2) having a carboxyl group at both ends was obtained. The number-average molecular weight of the thus-obtained oligomer was measured, and the value obtained is shown in Table 1.

TABLE 1

|  | OL-1 | OL-2 |
|---|---|---|
| tributylsilyl methacrylate | 100 | — |
| dimethylnorbornylsilyl acrylate | — | 100 |
| bis(4-aminophenyl) disulfide | 5 | — |
| bis(2-salicylic acid) disulfide | — | 5 |
| azobisisobutyronitrile | 0.6 | 0.6 |
| Number-average molecular weight | 2,100 | 1,900 |

EXAMPLE 1

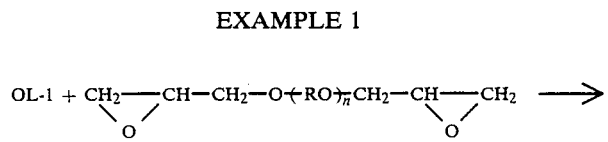

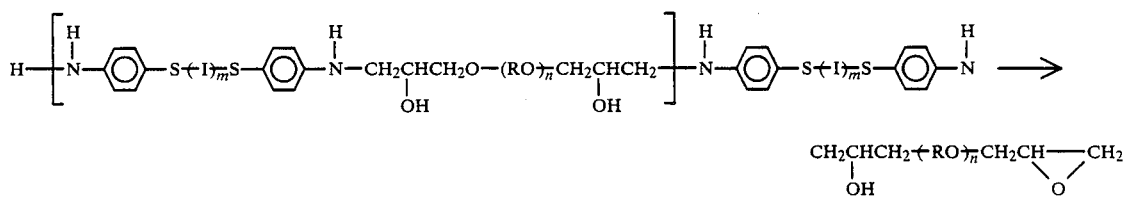

Into a reactor equipped with a stirrer, condenser, and thermometer were introduced 100 parts of the oligomer (OL-1) as obtained in Synthesis Example 1 and 100 parts of an α, ω-diglycidyloligoether having a molecular weight of 2,000. The resulting mixture was kept by uniformly stirring at room temperature for 8 hours to conduct polymerization. Thus, a block copolymer (V-1) of poly(tributylsilyl methacrylate) and polyether was obtained.

The polymer thus obtained was evaluated for number-average molecular weight and also subjected to accelerated dissolution test. The results obtained are shown in Table 2.

EXAMPLE 2

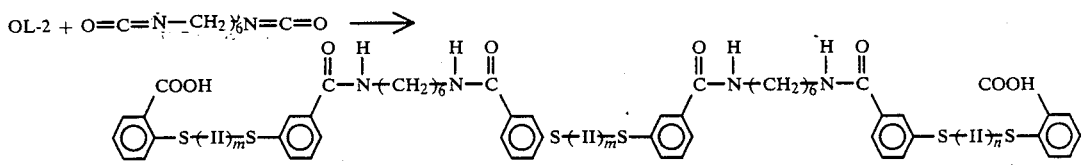

The number-average molecular weight of the polymer obtained and the results of accelerated dissolution test are shown in Table 2.

TABLE 2

|  | V-1 | V-2 |
|---|---|---|
| OL-1 | 100 | — |
| OL-2 | — | 100 |
| diglycidyloligoether | 100 | — |
| hexamethylene diisocyanate oligomer | — | 100 |
| Number-average molecular weight | 19,000 | 22,000 |
| Weight loss (g/day) | | |
| after 1 day | 0.15 | 0.54 |
| after 2 days | 0.14 | 0.50 |
| after 3 days | 0.16 | 0.60 |
| after 4 days | 0.17 | 0.54 |
| after 5 days | 0.15 | 0.51 |
| after 6 days | 0.14 | 0.49 |

As shown in Table 2, both vehicles composed of the copolymers obtained in Examples 1 and 2, respectively, were almost constant in weight loss everyday in the accelerated dissolution test. In other words, the dissolution curves were relatively linear (the rate of hydrolysis was constant).

SYNTHESIS EXAMPLE 3

Using methyl methacrylate as a monomer and bis(2-salicylic acid) disulfide as a chain transfer agent, polymerization was conducted in the same manner as in Synthesis Example 1, thereby obtaining methyl methacrylate oligomer (OL-3) having a carboxyl group at both ends. The number-average molecular weight of the thus-obtained oligomer was measured, and the value obtained is shown in Table 3.

SYNTHESIS EXAMPLE 4

Using styrene as a monomer and bis(4-isocyanatophenyl) disulfide as a chain transfer agent, polymerization was conducted in the same manner as in Synthesis Example 1, thereby obtaining styrene oligomer (OL-4) having an isocyanate group at both ends. The number-average molecular weight of the thus-obtained oligomer was measured, and the value obtained is shown in Table 3.

TABLE 3

|  | OL-3 | OL-4 |
|---|---|---|
| methyl methacrylate | 100 | — |
| styrene | — | 100 |
| bis(2-salicylic acid) disulfide | 5 | — |
| bis(4-isocyanatophenyl) disulfide | — | 5 |
| azobisisobutyronitrile | 0.6 | 0.6 |
| Number-average molecular weight | 1,800 | 1,900 | tion Thus, a dimethylnorbornylsilyl methacrylatesyyrene block copolymer (V-4) was obtained.

The polymer thus obtained was evaluated for number-average molecular weight and also subjected to accelerated dissolution test. The results obtained are shown in Table 4.

TABLE 4

|  | V-3 | V-4 |
|---|---|---|
| OL-1 | 100 | — |
| OL-2 | — | 100 |
| OL-3 | 100 | — |
| OL-4 | — | 100 |
| N-methyl-2-pyrrolidone | 100 | — |
| triphenyl phosphite | 50 | — |
| xylene | — | 200 |
| Number-average molecular weight | 23,000 | 20,500 |
| Weight loss (g/day) |  |  |
| after 1 day | 0.11 | 0.33 |
| after 2 days | 0.12 | 0.38 |
| after 3 days | 0.14 | 0.39 |
| after 4 days | 0.12 | 0.37 |
| after 5 days | 0.11 | 0.37 |
| after 6 days | 0.15 | 0.32 |

TABLE 5

| Analysis | Peak |
|---|---|
| IR Absorption, $cm^{-1}$ (Assignments are given in parentheses) | 2,950 (C—H) <br> 1,740 (C=O) <br> 1,250 (Si—C) <br> 1,160 (Si—O—C) |
| NMR, δ ppm | 1,520 (N—C—) with H and O |
| (d) $(CH_2-C)_m S-C_6H_4-N-C-C_6H_4 S(CH_2-C)_n$ with CH_3 (e), H O, CO, O, Si—(CH_2CH_2CH_2CH_3)_3 (c)(b)(a), and CH_3 (e), CO, O, CH_3 (f) | (a) 0.79 (m) <br> (b) 1.2 (m) <br> (c) 0.83 (m) <br> (d) 1.7 (s) <br> (e) 0.85 (s) <br> (f) 3.6 (s) |

EXAMPLE 3

Into a reactor equipped with a stirrer, condenser, and thermometer were introduced 100 parts of N-methyl-2-pyrrolidone. Thereto were added 100 parts of each of oligomers OL-1 and OL-3 obtained in Synthesis Examples 1 and 3, respectively, and 50 parts of triphenyl phosphite. The resulting mixture was kept by uniformly stirring at 150° C. for 30 hours to conduct polymerization. Thus, a tributylsilyl methacrylate-methyl methacrylate block copolymer (V-3) was obtained.

The polymer thus obtained was evaluated for number-average molecular weight and also subjected to accelerated dissolution test. The results obtained are shown in Table 4. This copolymer was further subjected to IR and NMR analyses, and the absorption peaks obtained and their assignments are shown in Table 5.

EXAMPLE 4

Into a reactor equipped with a stirrer, condenser, and thermometer were introduced 100 parts of each of oligomers OL-2 and OL-4 obtained in Synthesis Examples 2 and 4, respectively, and 200 parts of xylene. The resulting mixture was kept by uniformly stirring at room temperature for 8 hours to conduct polymeriza- As shown in Table 4, both vehicles composed of each of the copolymers obtained in those Examples were almost constant in weight loss everyday in the accelerated dissolution test. In other words, the dissolution curves were relatively linear (that is, the rate of hydrolysis was constant).

COMPARATIVE EXAMPLES 1 AND 2

Copolymers V-11 and V-12 were prepared directly from the monomers as shown in Table 6, without using a chain transfer agent. The copolymers thus obtained were evaluated for number-average molecular weight and also subjected to accelerated dissolution test. The results obtained are shown in Table 6.

TABLE 6

|  | V-11 | V-12 |
|---|---|---|
| tributylsilyl methacrylate | 50 | — |
| dimethylnorbornylsilyl acrylate | — | 50 |
| methyl methacrylate | 50 | — |
| styrene | — | 50 |
| azobisisobutyronitrile | 0.6 | 0.6 |
| Number-average molecular weight | 17,800 | 28,000 |
| Weight loss (g/day) |  |  |
| after 1 day | 0 | 0.01 |
| after 2 days | 0 | 0.02 |

TABLE 6-continued

|  | V-11 | V-12 |
| --- | --- | --- |
| after 3 days | 0.02 | 0.01 |
| after 4 days | 0.21 | 0.25 |
| after 5 days | 0.33 | 0.55 |
| after 6 days | 0.99 | 0.70 |

Table 6 shows that there was no or little weight loss by dissolution in the initial state of the immersion, but the weight loss began to increase rapidly during the immersion test.

While the invention has been described in detail and with reference to specific embodiments thereof, it will be apparent to one skilled in the art that various changes and modifications can be made therein without departing from the spirit and scope thereof.

What is claimed is:

1. A vehicle for a slow dissolving coating material, comprising a triorganosilyl (meth)acrylate copolymer consisting essentially of repeating units represented by the formula

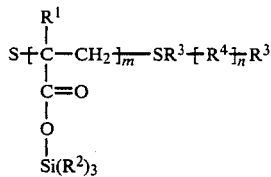

wherein $R^1$ represents hydrogen or methyl; $R^2$ represents a monovalent hydrocarbon group; $R^3$ is a group selected from the group consisting of

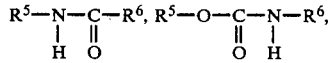

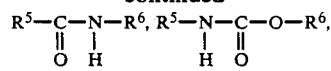

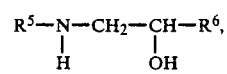

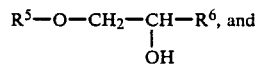

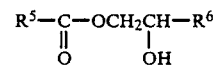

wherein $R^5$ represents a divalent hydrocarbon group containing an oxygen atom, an aromatic ring, or an alicyclic ring, and $R^6$ represents a divalent hydrocarbon group containing an oxygen atom, a sulfur atom, an aromatic ring, or an alicyclic ring; $R^4$ represents a divalent hydrocarbon group having 2 to 18 carbon atoms and containing an oxygen atom, an aromatic ring, or an alicyclic ring; and m and n each represents an integer of 1 or larger.

2. A vehicle as claimed in claim 1, wherein the monovalent hydrocarbon group of $R^2$ is a linear-chain or branched alkyl group, a cycloalkyl group, a phenyl group or a condensation ring type hydrocarbon group.

3. A vehicle as claimed in claim 1, wherein at least one of $R^2$ is a monovalent hydrocarbon group having 4 or more carbon atoms.

4. A vehicle as claimed in claim 1, wherein $R^4$ is a divalent hydrocarbon group derived from an ethylenically unsaturated compound.

5. A vehicle as claimed in claim 1, wherein m is an integer of 2 or more.

6. A vehicle as claimed in claim 1, wherein n is an integer of 2 or more.

7. A vehicle as claimed in claim 1, wherein the triorganosilyl (meth)acrylate copolymer is a copolymer of a both-end-functional triorganosilyl (meth)acrylate oligomer and a both-end-functional oligomer.

* * * * *